United States Patent [19]

Hong

[11] Patent Number: 5,339,109
[45] Date of Patent: Aug. 16, 1994

[54] APPARATUS FOR INTERPOLATING SCANNING LINES OF TV SIGNAL IN TV

[75] Inventor: Sung H. Hong, Seoul, Rep. of Korea

[73] Assignee: Goldstar Co., Ltd., Seoul, Rep. of Korea

[21] Appl. No.: 996,038

[22] Filed: Dec. 23, 1992

[30] Foreign Application Priority Data

Dec. 23, 1991 [KR] Rep. of Korea ............... 23994/1991

[51] Int. Cl.$^5$ ....................... H04N 7/01; H04N 11/20
[52] U.S. Cl. ..................................... 348/441; 348/448
[58] Field of Search ................. 358/140, 141, 142, 11, 358/12, 135, 136, 133; H04N 7/01, 11/6, 7/02, 11/20

[56] References Cited

U.S. PATENT DOCUMENTS

| | | | |
|---|---|---|---|
| 4,785,351 | 11/1988 | Ishikawa | 358/140 |
| 4,967,271 | 10/1990 | Campbell et al. | 358/140 |
| 5,093,721 | 3/1992 | Rabii | 358/12 |
| 5,157,490 | 10/1992 | Kawai et al. | 358/140 |

Primary Examiner—James J. Groody
Assistant Examiner—Michael H. Lee
Attorney, Agent, or Firm—Fliesler, Dubb, Meyer & Lovejoy

[57] ABSTRACT

An apparatus for interpolating scanning lines of a TV signal in a TV, comprising a scanning line interpolator for discriminating vertical, horizontal and diagonal edge patterns of a received video signal of the TV signal and extracting a signal for interpolation from the video signal using vertical, 45° end 135° diagonal average values, a first time compressor for compressing the time of the interpolation signal from the scanning line interpolator, a second time compressor for compressing the time of the video signal, and a switch for selectively and in turn outputting output signals from the first and second time compressors. The scanning line interpolator includes a one line memory for delaying the received video signal by one line, first to fourth horizontal comparison circuits, a diagonal/vertical sum signal output circuit for outputting first and second diagonal sum signals and a vertical sum signal, and an interpolation signal output circuit for selecting one of the first and second diagonal sum signals and the vertical sum signal from the diagonal/vertical sum signal output circuit in response to control signals from first and second control signal generating circuits, the selected signal having the smallest difference, averaging the selected signal and outputting the averaged signal as the interpolation signal.

8 Claims, 8 Drawing Sheets

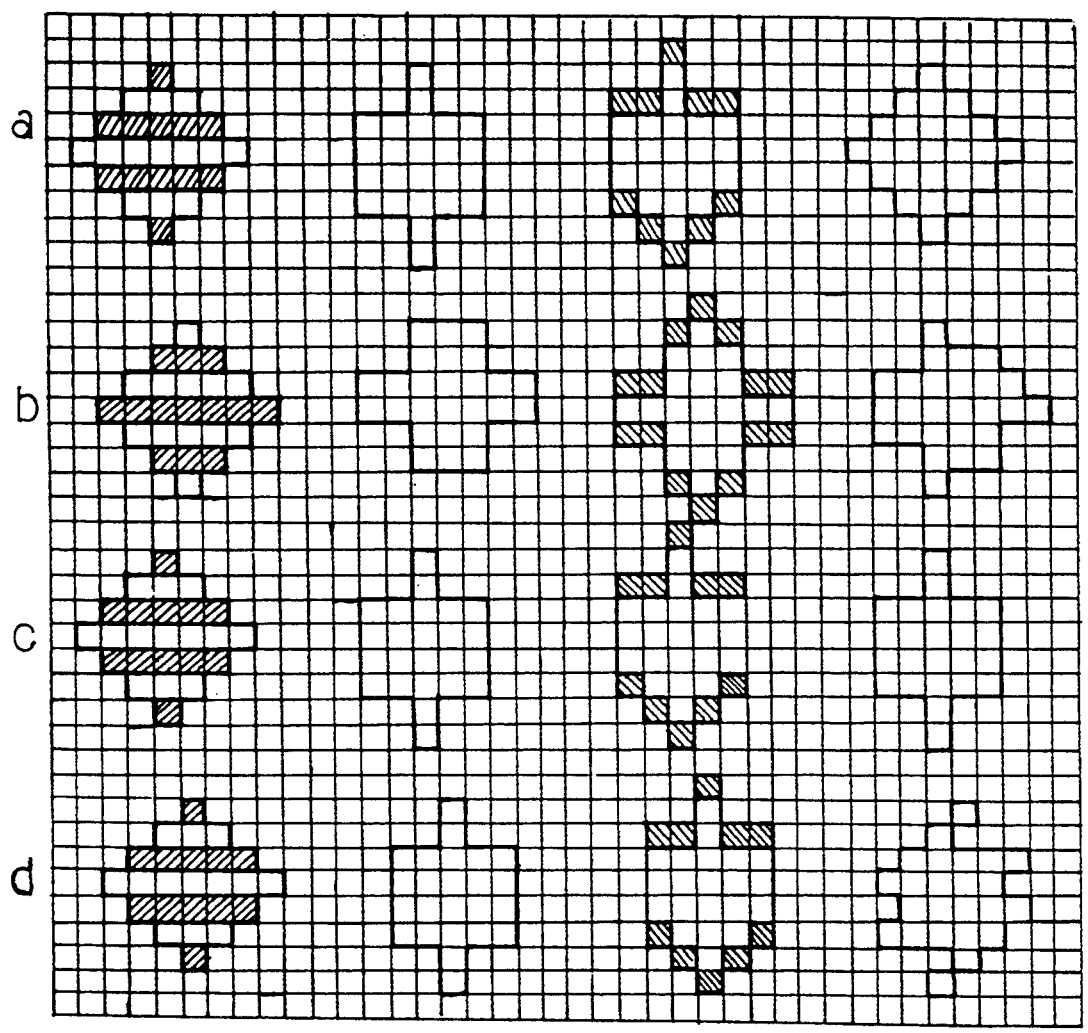

APPARATUS FOR INTERPOLATING SCANNING LINES OF TV SIGNAL IN TV

BACKGROUND OF THE INVENTION

1. Field of the Invention

The present invention relates in general to doubling the number of scanning line of a television signal in a television (TV) of the interlaced scanning type, and more particularly to an apparatus for interpolating scanning lines of a TV signal in a TV, which is useful in removing step edges of a video which has a diagonal variation in the case of using conventional line repetition and vertical average methods.

2. Description of the Prior Art

Generally, in a TV of the interlaced scanning type, a line structure, a line flicker, a vertical resolution insufficiency and etc. are generated as picture quality degradation elements due to the interlaced scanning. For this reason, for the purpose of solutions to these problems, there has conventionally been employed a method of scanning an interpolation scanning line between scanning lines to double the number of the scanning lines. The conventional method of doubling the number of the scanning lines includes an intrafield interpolation method which is classified into a line repetition method of performing the interpolation using the previous scanning line as the interpolation scanning line and a vertical average method of performing the interpolation by averaging the upper and lower scanning lines with respect to a scanning line to be interpolated, and an inter-field interpolation method of interpolating a scanning line of the previous field as the interpolation scanning line.

Referring to FIGS. 1A to 1D, there are shown block diagrams arc) views illustrating the conventional intrafield interpolation method, respectively. FIG. 1A is a block diagram of an intra-field interpolator using the line repetition and FIG. 1B is a view illustrating the intra-field interpolation method using the line repetition. In FIG. 1A, the intra-field interpolator comprises a one line memory 1 for delaying a received video signal Yin of a television signal by one line, a first time compressor 2 for compressing the time of an output signal from the one line memory 1 by 2 to 1, a second time compressor 3 for compressing the time of the video signal Yin by 2 to 1, and a switch SW1 for selectively outputting one of output signals from the first and second time compressors 2 and 3.

FIG. 1C is a block diagram of an intra-field interpolator using the vertical average and FIG. 1D is 8 view illustrating the intra-field interpolation method using the vertical average. In FIG. 1C, the intra-field interpolator comprises a one line memory 4 for delaying a received video signal Yin of a television signal by one line, an adder 5 for adding an output signal from the one line memory 4 to the video signal Yin, a ½ amplifier 6 for amplifying an output signal from the adder 5 by a ½ level, a first time compressor 7 for compressing the time of an output signal from the ½ amplifier 6 by 2 to 1, a second time compressor 8 for compressing the time of the video signal Yin by 2 to 1, and a switch SW2 for selectively outputting one of output signals from the first and second time compressors 7 and 8.

Referring to FIGS. 2A and 2B, there are shown a block diagram and a view illustrating the conventional inter-field interpolation method, respectively, FIG. 2A is a block diagram of an inter-field interpolator and FIG. 2B is a view illustrating the inter-field interpolation method. In FIG. 2A, the inter-field interpolator comprises a one field memory 9 for delaying a received video signal Yin of a television signal by one field, a first time compressor 10 for compressing the time of an output signal from the one field memory 9 by 2 to 1, a second time compressor 11 for compressing the time of the video signal Yin by 2 to 1, and a switch SW3 for selectively outputting one of output signals from the first and second time compressors 10 and 11.

The operations of the constructions in FIGS. 1A, 1C and 2A will hereinafter be described with reference to FIGS. 1B, 1D and 2B, respectively.

In FIG. 1B, a scanning line i to be interpolated is substituted by the previous line. Namely, the time of the video signal Yin delayed by the one line memory 1 is compressed by 2 to 1 by the first time compressor 2 and the time of the original video signal Yin is compressed by 2 to 1 by the second time compressor 3. As a result, the first switch SW1 selects the output signal from the first time compressor 2 with respect to the scanning line to be interpolated and selects the output signal from the second time compressor 3 with respect to the original scanning line. At this time, a switching clock of the first switch SW1 is half a period of one scanning line of the inputted signal, In FIG. 1D, the scanning line i to be interpolated is substituted by averaging the upper and lower scanning lines a and b about the scanning line i in the field. Namely, the video signal Yin delayed by the one line memory 4 to added to the original video signal Yin by the adder 5 and then amplified by the ½ amplifier 6. The time of the output signal from the ½ amplifier 6 is compressed by 2 to 1 by the first time compressor 7 and the time of the original video signal Yin is compressed by 2 to 1 by the second time compressor 8. As a result, in a similar manner to that mentioned above with reference to FIG. 1A, the switch SW2 selects the output signal from the first time compressor 7 with respect to the scanning line to be interpolated and selects the output signal from the second time compressor 8 with respect to the original scanning line.

In FIG. 2B, the scanning line i to be interpolated is substituted by a scanning line of the previous field. Namely, the time of the video signal Yin delayed by the one field memory 9 is compressed by 2 to 1 by the first time compressor 10 and the time of the original video signal Yin is compressed by 2 to 1 by the second time compressor 11. As s result, the third switch SW3 selects the output signal from the first time compressor 10 with respect to the scanning line to be interpolated and selects the output signal from the second time compressor 11 with respect to the original scanning line.

However, the above-mentioned conventional interpolation methods have disadvantages as shown in FIGS. 3B to 3D. FIG. 3A is a waveform diagram illustrating a motion of the original video in one field. The reference numeral a represents a still video, the reference numeral b represents the video moved by one sample to the right, the reference numeral c represents the video moved by one sample upward and the reference numeral d represents the video moved by one sample diagonally. FIG. 3B is a waveform diagram illustrating the interpolation result which is obtained by utilizing the line repetition. From FIG. 3B, it can be seen that many step edges appear at the still video and the video of slow motion. FIG. 3C is a waveform diagram illustrating the interpolation result which is obtained by utilizing the line average or the vertical average. It can be seen from FIG. 3C that blurred edge portions appear at the still video and the video of slow motion. FIG. 3D is a waveform diagram illustrating the interpolation result which is obtained by utilizing the interfield interpolation. Herein, the interpolation is accurately performed at the still video, but inaccurately at the moved video.

SUMMARY OF THE INVENTION

Therefore, the present invention has been made in view of the above problems, and it is an object of the present invention to provide an apparatus for interpolating scanning lines of a TV signal in a TV, which is capable of removing step edges of an interpolated video by interpolating the scanning lines utilizing diagonal and vertical averages on the basis of control signals which are different according to edge patterns of a video signal of the interlaced scanning type.

In accordance with the present invention, the above and other objects can be accomplished by a provision of an apparatus for interpolating scanning lines of a TV signal in a TV, comprising: scanning line interpolating means for discriminating vertical, horizontal and diagonal edge patterns of a received video signal of the TV signal and extracting a signal for interpolation from the video signal using vertical, 45° and 135° diagonal average values; first time compressing means for compressing the time of the interpolation signal from said scanning line interpolating means; second time compressing means for compressing the time of the video signal; and switching means for selectively and in turn outputting output signals from said first and second time compressing means.

In accordance with one aspect of the present invention, the scanning line interpolating means includes a one line memory for delaying the received video signal by one line; first horizontal comparison means for delaying the received video signal by one sample, detecting a difference between the video signal and the one sample-delayed video signal, taking an absolute value of the detected difference and comparing the absolute value with a predetermined reference value; second horizontal comparison means for delaying the one sample-delayed video signal from said first horizontal comparison means by one sample, detecting a difference between the one sample-delayed video signal and the two-sample-delayed video signal, taking an absolute value of the detected difference and comparing the absolute value with a predetermined reference value; third horizontal comparison means for delaying the one line-delayed video signal from said one line memory by one sample, detecting a difference between the one line-delayed video signal and the one line-delayed and then one sample-delayed video signal, taking an absolute value of the detected difference and comparing the absolute value with a predetermined reference value; fourth horizontal comparison means for delaying the one line-delayed and then one sample-delayed video signal from said third horizontal comparison means by one sample, detecting a difference between the one line-delayed and then one sample-delayed video signal and the one line-delayed and then two-sample-delayed video signal, taking an absolute value of the detected difference and comparing the absolute value with a predetermined reference value; diagonal/vertical sum signal output means for summing up the received video signal and the one line-delayed and then two- sample-delayed video signal from said fourth horizontal comparison means to output a first diagonal sum signal, summing up the two-sample-delayed video signal from said second horizontal comparison means and the one line-delayed video signal from said one line memory to output a second diagonal sum signal and summing up the one sample-delayed video signal from said first horizontal comparison means and the one line-delayed and then one sample-delayed video signal from said third horizontal comparison means to output a vertical sum signal; first control signal generating means for adding the horizontal difference signals from said first to fourth horizontal comparison means, detecting a vertical difference signal between the one sample-delayed video signal from said first horizontal comparison means and the one line-delayed and then one sample-delayed video signal from said third horizontal comparison means and exclusive-ORing the added signal and the vertical difference signal to generate a control signal; second control signal generating means for generating a control signal in response to control signals from said first to fourth horizontal comparison means; and interpolation signal output means for selecting one of the first and second diagonal sum signals and the vertical sum signal from said diagonal/vertical sum signal output means in response to the control signals from said first and second control signal generating means, the selected signal having the smallest difference, averaging the selected signal and outputting the averaged signal as the interpolation signal.

In accordance with another aspect of the present invention, the scanning line interpolating means includes a one line memory for delaying the received video signal by one line; first horizontal comparison means for delaying the received video signal by one sample, detecting a difference between the video signal and the one sample-delayed video signal, taking an absolute value of the detected difference and comparing the absolute value with a predetermined reference value; second horizontal comparison means for delaying the one sample-delayed video signal from said first horizontal comparison means by one sample, detecting a difference between the one sample-delayed video signal and the two-sample-delayed video signal, taking an absolute value of the detected difference and comparing the absolute value with a predetermined reference value; third horizontal comparison means for delaying the one line-delayed video signal from said one line memory by one sample, detecting a difference between the one line-delayed video signal and the one line-delayed and then one sample-delayed video signal, taking an absolute value of the detected difference and comparing the absolute value with a predetermined reference value; fourth horizontal comparison means for delaying the one line-delayed and then one sample-delayed video signal from said third horizontal comparison means by one sample, detecting a difference between the one line-delayed and then one sample-delayed video signal and the one line-delayed and then two-sample-delayed video signal, taking an absolute value of the detected difference and comparing the absolute value with a predetermined reference value; diagonal/vertical sum signal output means for summing up the received video signal and the one line-delayed and then two- sample-delayed video signal from said fourth horizontal comparison means to output a first diagonal sum signal, summing up the two-sampledelayed video signal from said second horizontal comparison means and the one line-delayed video signal from said one line memory to output a second diagonal sum signal and summing up the one sample-delayed video signal from said first horizontal comparison means and the one line-delayed and then one sample-delayed video signal from said third horizontal comparison means to output a vertical sum signal; first control signal generating means for adding the horizontal difference signals from said first to fourth horizontal comparison means, detecting a vertical difference signal between the one sample-delayed video signal from said first horizontal comparison means and the one line-delayed and then one sample-delayed video signal from said third horizontal comparison means and exclusive-ORing the added signal and the vertical difference signal to generate a control signal; second control signal generating means for generating a control signal in response to control signals from said first to fourth horizontal comparison means; weight generating means for generating a weight signal in response to the control signal from said second control signal generating means; diagonal interpolation signal generating means for selecting one of first and second diagonal sum signals from said diagonal/vertical sum signal output means in response to the control signal from said first control signal generating means, the selected signal having a smaller diagonal difference, and amplifying the selected signal by a gain based on the weight signal from said weight generating means; and interpolation signal output means for amplifying the vertical Bum signal from said diagonal/vertical sum signal output means by the gain based on the weight signal from said weight generating means, summing up the amplified vertical sum signal and a diagonal interpolation signal from said diagonal interpolation signal generating means, averaging the summed signal and outputting the averaged signal as the interpolation signal.

BRIEF DESCRIPTION OF THE DRAWINGS

The above and other objects, features and advantages of the present invention will be more clearly understood from the following detailed description taken in conjunction with the accompanying drawings, in which:

FIGS. 1A to 1D are block diagrams and views illustrating a conventional intra-field interpolation method, respectively, wherein:

FIG. 1A is a block diagram of an intra-field interpolator using a line repetition;

FIG. 1B is a view illustrating the intra-field interpolation method using the line repetition;

FIG. 1C is a block diagram of an intra-field interpolator using a vertical average; and FIG. 1D is a view illustrating the intra-field interpolation method using the vertical average;

FIGS. 2A and 2B are a block diagram and a view illustrating a conventional inter-field interpolation method, respectively, wherein:

FIG. 2A is a block diagram of an inter-field interpolator; and

FIG. 2B is a view illustrating the inter-field interpolation method;

FIG. 3A is a waveform diagram illustrating a motion of the original video in one field;

FIG. 3B is a waveform diagram illustrating the interpolation result which is obtained by utilizing the line repetition;

FIG. 3C is a waveform diagram illustrating the interpolation result which is obtained by utilizing the vertical average;

FIG. 3D is a waveform diagram illustrating the interpolation result which is obtained by utilizing the inter-field interpolation;

DETAILED DESCRIPTION OF THE PREFERRED EMBODIMENTS

Figure 1A:
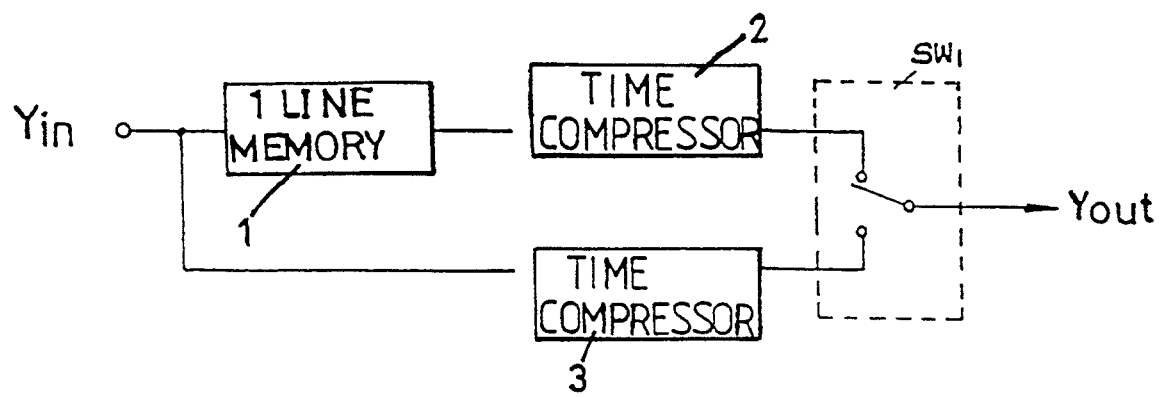
Figure 1B:
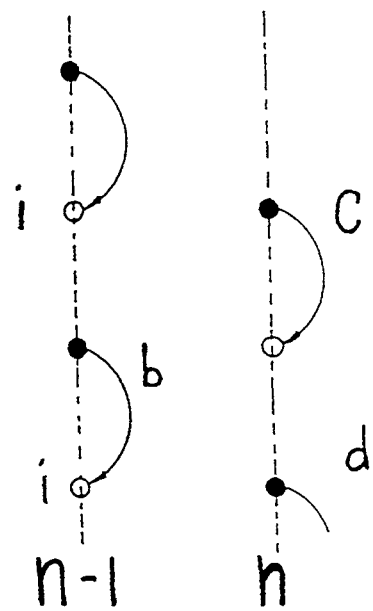
Figure 1C:
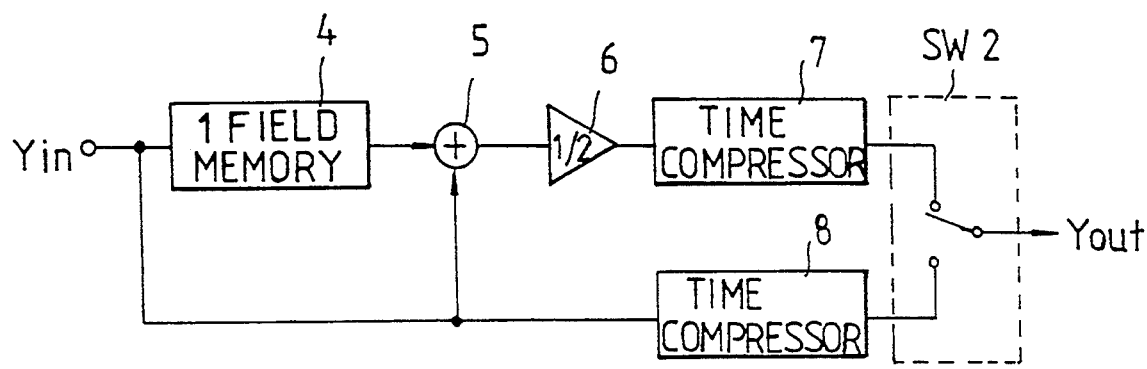
Figure 1D:
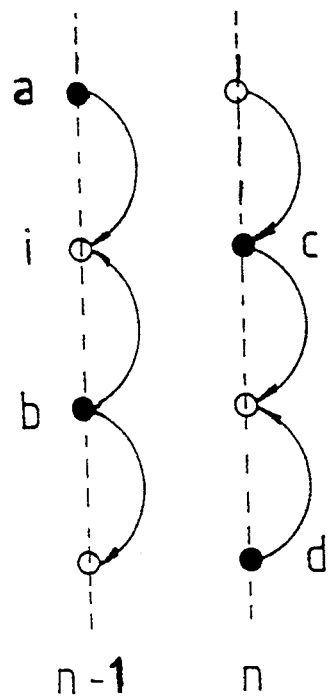
Figure 2A:
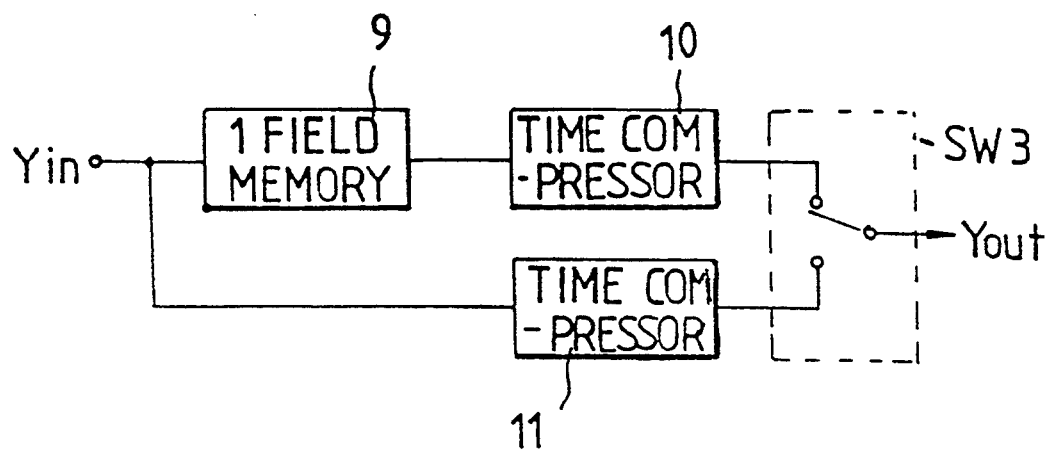
Figure 2B:
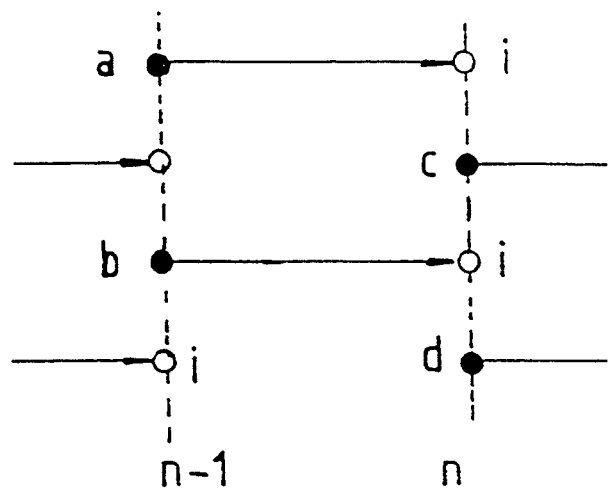
Figure 4:
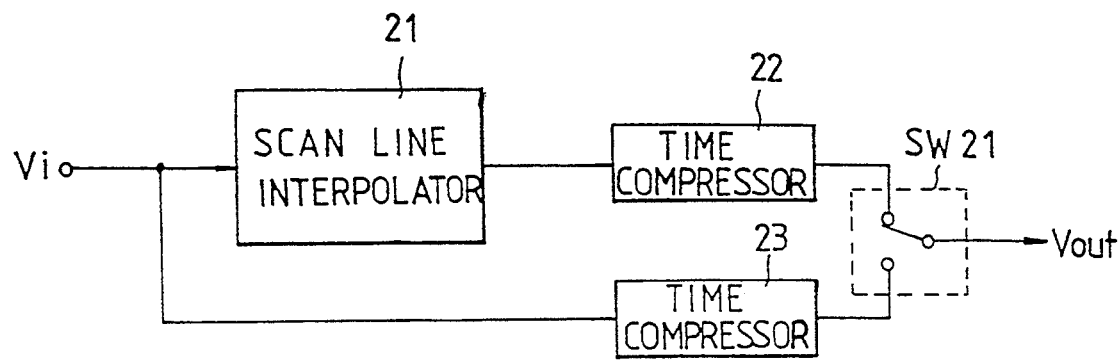
FIG. 4 is a block diagram of an apparatus for interpolating scanning lines of a TV signal in a TV in accordance with the present invention.

Referring to FIG. 4, there is shown a block diagram of an apparatus for interpolating scanning lines of a TV signal in a TV in accordance with the present invention. As shown in this figure, the scanning line interpolating apparatus of the present invention comprises a scanning line interpolator 21 for extracting a signal for interpolation from a received video signal Vi of the television signal, a first time compressor 22 for compressing the time of the interpolation signal from the scanning line interpolator 21 by 2 to 1, a second time compressor 23 for compressing the time of the video signal Vi by 2 to 1, and a switch 21 for selectively and in turn outputting output signals from the first and second time compressors 22 and 23.

Figure 5:
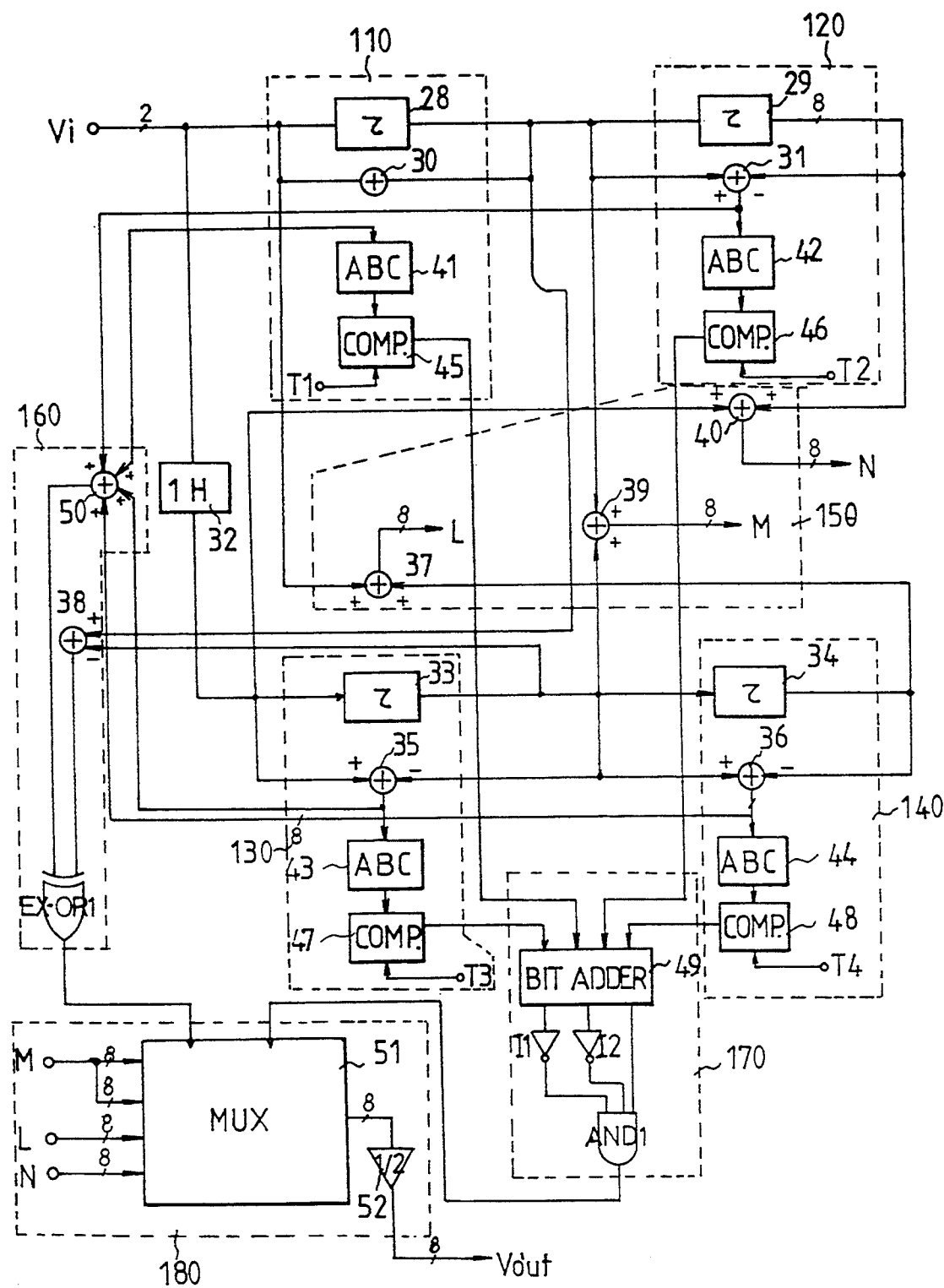
FIG. 5 is a detailed block diagram of a scanning line interpolator in the apparatus in FIG. 4 in accordance with an embodiment of the present invention.

Referring to FIG. 5, there is shown a detailed block diagram of the scanning line interpolator 21 in the apparatus in FIG. 4 in accordance with an embodiment of the present invention. As shown in this drawing, the scanning line interpolator 21 includes a one line memory 32 for delaying the received video signal Vi by one line, a first horizontal comparison circuit 110 for delaying the received video signal Vi by one sample, detecting a difference between the video signal Vi and the one sample-delayed video signal, taking an absolute value of the detected difference and comparing the absolute value with a predetermined reference value T1, a second horizontal comparison circuit 120 for delaying the one sample-delayed video signal from the first horizontal comparison circuit 110 by one sample, detecting a difference between the one sample-delayed video signal and the two-sample-delayed video signal, taking an absolute value of the detected difference and comparing the absolute value with a predetermined reference value T2, a third horizontal comparison circuit 130 for delaying the one line-delayed video signal from the one line memory 32 by one sample, detecting a difference between the one line-delayed video signal and the one line-delayed and then one sample-delayed video signal, taking an absolute value of the detected difference and comparing the absolute value with a predetermined reference value T3, and a fourth horizontal comparison circuit 140 for delaying the one line-delayed and then one sample-delayed video signal from the third horizontal comparison circuit 130 by one sample, detecting a difference between the one line-delayed and then one sample-delayed video signal and the one line-delayed and then two-sample-delayed video signal, taking an absolute value of the detected difference and comparing the absolute value with a predetermined reference value T4.

The scanning line interpolator 21 also comprises a diagonal/vertical sum signal output circuit 150 for summing up the received video signal Vi and the one line-delayed and then two- sample-delayed video signal from the fourth horizontal comparison circuit 140 to output a first diagonal sum signal L, summing up the two-sample-delayed video signal from the second horizontal comparison circuit 120 and the one line-delayed video signal from the one line memory 32 to output a second diagonal sum signal N and summing up the one sample-delayed video signal from the first horizontal comparison circuit 110 and the one line-delayed and then one sample-delayed video signal from the third horizontal comparison circuit 130 to output a vertical sum signal M, a first control signal generating circuit 160 for adding the horizontal difference signals from the first to fourth horizontal circuits 110–140 detecting a vertical difference comparison signal between the one sample-delayed video signal from the first horizontal comparison circuit 110 and the one line-delayed and then one sample-delayed video signal from the third horizontal comparison circuit 130 and exclusive-ORing the added signal and the vertical difference signal to generate a control signal, a second control signal generating circuit 170 for generating a control signal in response to control signals from the first to fourth horizontal comparison circuits 110–140, and an interpolation signal output circuit 180 for selecting one of the the first and second diagonal sum signals L and N and the vertical sum signal M from the diagonal/vertical sum signal output circuit 150 in response to the control signals from the first and second control signal generating circuits 160 and 170, the selected signal having the smallest difference, averaging the selected signal and outputting the averaged signal as the interpolation signal.

The first to fourth horizontal comparison circuits 110–140 each includes a one sample memory for delaying a signal inputted therein by one sample, a subtracter for subtracting an output signal from the one sample memory from the signal inputted in the one sample memory, an absolute generator for taking an absolute of an output signal from the subtracter and a comparator for comparing an output signal from the absolute generator with a predetermined reference value.

The second control signal generating circuit 170 includes a bit adder 49 for adding the control signals D10–D13 from the first to fourth horizontal comparison circuits 110–140, inverters I1 and I2 for Inverting high order 2 bits of an output signal from the bit adder 49, respectively, and an AND gate AND1 for ANDing output signals from the inverter gates I1 and I2 and a least significant bit of the output signal from the bit adder 49 and outputting the ANDed signal as the control signal.

Figure 6:
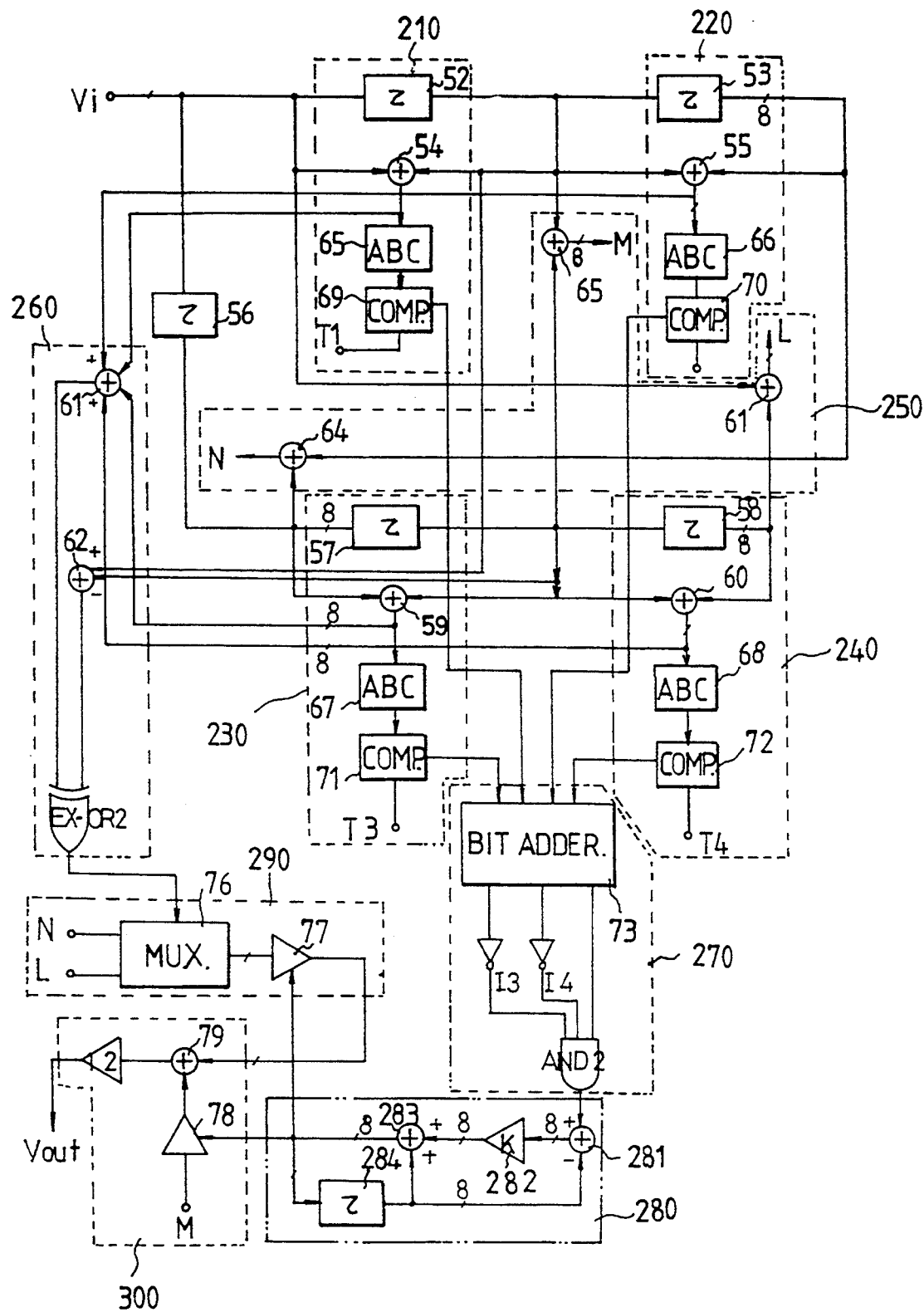
FIG. 6 is a detailed block diagram of the scanning line interpolator in the apparatus in FIG. 4 in accordance with an alternative embodiment of the present invention.

Referring to FIG. 6, there is shown a detailed block diagram of the scanning line interpolator 21 in the apparatus in FIG. 4 tn accordance with an alternative embodiment of the present invention. As shown in this figure, the scanning line interpolator 21 includes first to fourth horizontal comparison circuits 210–240, a diagonal/vertical sum signal output circuit 250, a first control signal generating circuit 260, second control signal generating circuit 270, a weight generating circuit 280 for generating a weight signal in response to a control signal from the second control signal generating circuit 270, a diagonal interpolation signal generating circuit 290 for selecting one of first and second diagonal sum signals L and N from the diagonal/vertical sum signal output circuit 250 in response to a control signal from the first control signal generating circuit 260, the selected signal having a smaller diagonal difference, and amplifying the selected signal by a gain based on the weight signal from the weight generating circuit 280, and an interpolation signal output circuit 300 for amplifying a vertical sum signal M from the diagonal/vertical sum signal output circuit 250 by the gain based on the weight signal from the weight generating circuit 280, summing up the amplified vertical sum signal M and a diagonal interpolation signal from the diagonal interpolation signal generating circuit 290, averaging the summed signal and outputting the averaged signal as the interpolation signal.

Herein, the constructions of the first to fourth horizontal comparison circuits 210–240, the diagonal/vertical sum signal output circuit 250, the first control signal generating circuit 280 and the second control signal generating circuit 270 are the same as those in FIG. 5 and a description thereof will thus be omitted.

The weight generating circuit 280 Is a typical IIR filter and includes a subtracter 281 for obtaining a difference between an input signal Xn and an output signal from the weight generating circuit 280 delayed by one sample, a K amplifier 282 for amplifying an output signal from the subtracter 281 by a predetermined weight, an adder 283 for adding an output signal from the K amplifier 282 to the output signal from the weight generating circuit 280 delayed by one sample and outputting the added signal as the weight signal, and a one sample memory 284 for delaying an output signal from the adder 283 by one sample and feeding back the one sample-delayed signal to the subtracter 281 and the adder 283. The weight generating circuit will hereinafter be referred to as the IIR filter.

The operation of the scanning line interpolating apparatus with the above-mentioned construction in accordance with the present invention wi 11 hereinafter be described in detail with reference to FIGS. 4 through 8.

The video signal Vi or luminance and chrominance signals separated from the received TV signal is applied to the scanning line interpolator 21 with the construction in FIG. 5 or 6. The scanning line interpolator 21 extracts the interpolation signal from the received video signal Vi and outputs it to the first time compressor 22. The video signal Vi is also applied to the second time compressor 23. The first and second time compressors 22 and 23 perform the time compression with respect to the inputted signals. The switch SW21 selects the output signal from the second time compressor 23 with respect to the original position and selects the output signal from the first time compressor 22 with respect to the position to be interpolated. At this time, a switching clock of the switch SW21 is $T_H/2$ ($T_H$: about 63.5 μsec in a NTSC system).

In FIG. 5, the video signal Vi Of the interlaced scanning type is summed up to the signal delayed by the one line memory 32 and the third and fourth sample memories 33 and 34, thereby resulting in production of the sum signal L of 135′ diagonal components. The signal delayed by the first one sample memory 30 is summed up to the signal delayed by the one line memory 32 and the third one sample memory 33, thereby resulting in production of the sum signal H of vertical components. The signal delayed by the first and second one sample memories 28 and 29 is summed up to the signal delayed by the one line memory 32, thereby resulting in production of the sum signal N of 45° diagonal components.

In the first to fourth horizontal comparison circuits 110–140, the output signals from the first to fourth subtracters 30, 31, 35 and 36 are applied to the first to fourth comparators 45–48 through the first to fourth absolute generators 41–44, respectively. AS a result, the first to fourth comparators 45–48 output the control signals D10–D13 based on the edge patterns as shown in FIGS. 7A to 7F, respectively.

In the second control signal generating circuit 170, the control signals D10–D13 from the first to fourth horizontal comparison circuits 110–140 are added in the bit adder 49. The inverters I1 and I2 invert the high order 2 bits of the output signal from the bit adder 49, respectively, and the AND gate AND1 ANDs the output signals from the inverter gates I1 and I2 and the least significant bit of the output signal from the bit adder 49.

At this time, when the edge pattern is a diagonal pattern (45° or 135°), the output from the AND gate AND1 is high. When the edge pattern is a horizontal or vertical pattern, the output from the AND gate ANDt is low.

The difference signals from the first to fourth subtracters 30, 31, 35 and 36 are added in the adder 50, which outputs the added signal as a sine bit (1 bit). The exclusive-OR gate EX-OR1 exclusive-ORs the sine bit from the adder 50 and a sine bit He of the vertical difference signal. If the sine bits are the same, the edge pattern is 45° edge, As a result, the output from the exclusive-OR gate EX-OR1 is low. If the sine bits are not the same, the edge pattern is 135° edge. As a result, the output from the exclusive-OR gate EX-OR1 is high.

The output signal from the AND gate AND1 and the output signal from the exclusive-OR gate EX-OR1 are used as the most and least significant bits MSB and LSB of the multiplexer 51, respectively. When the output signals from the AND gate AND1 and the exclusive-OR gate EX-OR1 as control signals all are high, the multiplexer 51 outputs the 135° diagonal component sum signal L. When the output signals from the AND gate AND1 and the exclusive-OR gate EX-OR1 as control signals are low and low or low and high, the mulltiplexer 51 outputs the vertical component sum signal M. Also, the multiplexer 51 outputs the 45° diagonal component sum signal N when the output signals from the AND gate AND1 and the exclusive-OR gate EX-OR1 are high and low. The output signal from multiplexer 51 is amplified by 172 in the ½ amplifier 52. In result, the output signal from the ½ amplifier 52 is the interpolation signal.

On the other hand, in FIG. 6, there are generated the 135° diagonal component sum signal L, the vertical component sum signal M, the 45° diagonal component sum signal N, the edge pattern control signals D10–D13 and the vertical control signal Ho.

The Output signal from the exclusive-OR gate EX-OR2 is a control signal for discriminating whether the diagonal edge pattern is 45° or 135°. In response to the control signal from the exclusive-OR gate EX-OR2, the multiplexer 76 outputs the 135° diagonal component sum signal L or the 45° diagonal component sum signal N.

The output signal from the AND gate AND2 in the second control signal generating circuit 270 tea control signal for discrimination of the diagonal edge pattern and is applied to the IIR filter 280, which maintains a consistency of the control signal for discrimination of the edge pattern. The IIR filter 280 acts to maintain a consistency of the control signal for discrimination of the edits pattern to prevent a considerable picture quality degradation due to a discrimination error. Assuming that the input of the IIR filter 280 is Ci(n), the output thereof can De expressed by the following equation:

$$Co(n) = K \cdot Ci(n) + (1-K) Co(n-1)$$

The frequency response of the IIR filter 280 can be expressed by the following equation:

$$H(e^{jw}) = K/[1 (1-K)e^{-jw}]$$

From the above equation, it can be seen that the output signal is sensitive to the input signal as the K value becomes large.

The output signal Co(n) from the IIR filter 280 is multiplied by the diagonal component sum output from the multiplexer 76 in the first variable amplifier 77. On the other hand, in the second variable amplifier 78, the value of $1-Co(n)$ is multiplied by the vertical component sum signal M. The output signals from the first and second variable amplifiers 77 and 78 are added in the adder 79 and then amplified by ½ in the ½ amplifier 80. In result, the output signal from the ½ amplifier 80 is the interpolation signal.

Figure 8:
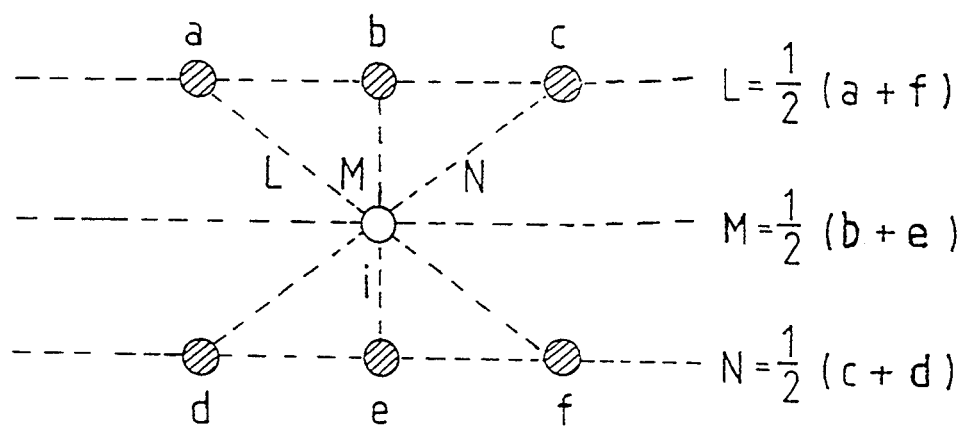
FIG. 8 is a view illustrating a proposed interpolation method on a two-dimensional area in accordance with the present invention.

FIGS. 7A to 7F show characteristics of the control signals which are different according to the edge patterns accordance with the present invention and FIG. 8 a view illustrating a proposed interpolation method on a two-dimensional area in accordance with the present invention. The control signals can be expressed as follows:

$$D10 = a-b, [X_{-1}(n-1) - X_{-1}(n)],$$

$$D11 = b-c, [X_{-1}(n) - X_{-1}(n+1)],$$

$$D12 = d-e, [X_{+1}(n-1) - X_1(n)],$$

$$D13 = e-f, [X_{+1}(n) - X_{+1}(n+1)], \text{ and}$$

$$Ho = b-e, [X_{-1}(n) - X_{+1}(n)]$$

Assuming that the sample to be interpolated is i, the above control signals can be changed according to the edge patterns as follows. Namely, as shown in FIGS. 7A to 7D, in the case of a diagonal edge which is varied diagonally, only one of the control signals D10–D13 exceeds a predetermined threshold voltage. In the case of a 135° edge (\), the sum of the control signals D10–D13 and the control signal Ho are exclusive-ORed into 1. In the case of a 45° edge (/), the sum of the control signals D10–D13 and the control signal Ho are exclusive-ORed into O.

Figure 7A:
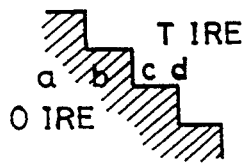
FIGS. 7A to 7F show characteristics of control signals which are different according to edge patterns in accordance with the present invention.
Figure 7B:
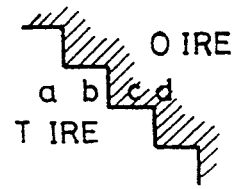
Figure 7C:
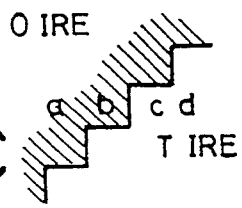
Figure 7D:
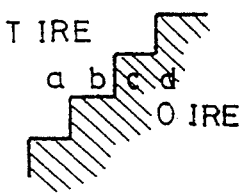
Figure 7E:

Also tn the case of a vertical edge (|) as shown in FIG. 7E, the control signal Ho does not exceed the predetermined threshold and, therefore, the number of the control signals D10–D13 exceeding the predetermined threshold voltage is 0 or two or more.

Figure 7F:
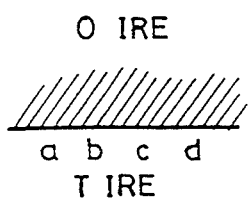

In the case of a horizontal edge (—) as shown in FIG. 7F, the control signal Ho exceeds the predetermined threshold voltage and the number of the control signals D10–D13 exceeding the predetermined threshold voltage is 0.

Accordingly, the interpolation value applied to the sample to be interpolated on the two-dimensional area as shown in FIG. 8 is L[= ½(a + f)] in the case of the 135° edge ( \ ) and N[= ½(c + d)] in the case of the 45° edge (/). Also in the case other than the 45° or 135° edge, a vertical average H[½(b + e)] is used as the interpolation value, As hereinbefore described, according to the present invention, there is provided the apparatus for interpolating the scanning lines of the TV signal in the TV, which is capable of removing the step edges of the interpolated video by interpolating the scanning lines utilizing the diagonal and vertical averages on the basis of the control signals which are different according to the horizontal, vertical and diagonal edge patterns of the video signal of the interlaced scanning type.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for interpolating scanning lines of a TV signal in a TV, comprising:

scanning the interpolating means for discriminating vertical, horizontal and diagonal edge patterns of a received video signal of the TV signal and extracting a signal for interpolation from the video signal using vertical, 45° and 135° diagonal average values; wherein said scanning line interpolating means includes:

a one line memory for delaying the received video signal by one line; first horizontal comparison means for delaying the received video signal by one sample, detecting a difference between the video signal and the one sample-delayed video signal, taking an absolute value of the detected difference and comparing the absolute value with a predetermined reference value;

second horizontal comparison means for delaying the one sample-delayed video signal from said first horizontal comparison means by one sample, detecting a difference between the one sample-delayed video signal and the two-sample-delayed video signal, taking an absolute value of the detected difference and comparing the absolute value with a predetermined reference value;

third horizontal comparison means for delaying the one line-delayed video signal from said one line memory by one sample, detecting a difference between the one line-delayed video signal and the one line-delayed and then one sample-delayed video signal, taking an absolute value o the detected difference and comparing the absolute value with a predetermined reference value;

fourth horizontal comparing means for delaying the one line-delayed and then one sample-delayed video signal from said third horizontal comparison means by one sample, detecting a difference between the one line-delayed and then one sample-delayed video signal and the one line-delayed and then two-sample-delayed video signal, taking an absolute value of the detected difference and comparing the absolute value with a predetermined reference value;

diagonal/vertical sum signal output means for summing up the received video signal and the one line-delayed and then two-sample-delayed video signal from said fourth horizontal comparison means to output a first diagonal sum signal, summing up the two-sample-delayed video signal from said second horizontal comparison means and the one line-delayed video signal from said one line memory to output a second diagonal sum signal and summing up the one sample-delayed video signal from said first horizontal comparison means and the one line-delayed and then one sample-delayed video signal from said third horizontal comparison means to output a vertical sum signal;

first control signal generating means for adding the horizontal difference signals from said first to fourth horizontal comparison means, detecting a vertical difference signal between the one sample-delayed video signal from said first horizontal comparison means and the one line-delayed and then one sample-delayed video signal from said third horizontal comparison means and exclusive-ORing the sign bit of the added signal and that of the vertical difference signal to generate a control signal;

second control signal generating means for generating a control signal in response to control signals from said first to fourth horizontal comparison means;

interpolation signal output means for selecting one of the first and second diagonal sum signals and the vertical sum signal from said diagonal/vertical sum signal output means in response to the control signals from said first and second control signal generating means, the selected signal having the smallest difference, averaging the selected signal and outputting the averaged signal as the interpolation signal;

first time compressing means for compressing the time of the interpolation signal from said scanning line interpolating means; and second time compressing means for compressing the time of the video signal; and switching means for selectively and in turn outputting output signals from said first and second time compressing means.

2. An apparatus for interpolating scanning lines of a TV signal in a TV, as set forth in claim 1, wherein said first to fourth horizontal comparison means each includes:

a one sample memory for delaying a signal inputted therein by one sample;

a subtracter for subtracting an output signal from said one sample memory from the signal inputted in said one sample memory;

an absolute generator for taking an absolute of an output signal from said subtracter; and a comparator for comparing an output signal from said absolute generator with a predetermined reference value.

3. An apparatus for interpolating scanning lines of a TV signal in a TV, as set forth in claim 1, wherein said second control signal generating means includes:
   a bit adder for adding the control signal s from said first to fourth horizontal comparison means;
   inverters for inverting high order 2 bits of an output signal from said bit adder, respectively; and
   an AND gate for ANDing output signal from said inverter gates and a least significant bit of the output signal from said bit adder and outputting the ANDed signal as the control signal.

4. An apparatus for interpolating scanning lines of a TV signal in a TV, comprising:
   scanning line interpolating means for discriminating vertical, horizontal and diagonal edge patterns of a received video signal of the TV signal and extracting a signal for interpolation from the video signal using vertical, 45° and 135° diagonal average values; wherein said scanning line interpolating means includes:
      a one line memory for delaying the received video signal by one line;
      first horizontal comparison means for delaying the received video signal by one sample, detecting a difference between the video signal and the one sample-delayed video signal, taking an absolute value of the detected difference and comparing the absolute value with a predetermined reference value;
      second horizontal comparison means for delaying the one sample-delayed video signal from said first horizontal comparison means by one sample, detecting a difference between the one sample-delayed video signal and the two-sample-delayed video signal, taking an absolute value of the detected difference and comparing the absolute value with a predetermined reference value;
      third horizontal comparison means for delaying the one line-delayed video signal from said one line memory by one sample, detecting a difference between the one line-delayed video signal and the one line-delayed and then one sample-delayed video signal, taking an absolute value of the detected difference and comparing the absolute value with a predetermined reference value;
      fourth horizontal comparing means for delaying the one line-delayed and then one sample-delayed video signal from said third horizontal comparison means by one sample, detecting a difference between the one line-delayed and then one sample-delayed video signal and the one line-delayed and then two-sample-delayed video signal, taking an absolute value of the detected difference and comparing the absolute value with a predetermined reference value;
      diagonal/vertical sum signal output means for summing up the received video signal and the one line-delayed and then two-sample-delayed video signal from said fourth horizontal comparison means to output a first diagonal sum signal, summing up the two-sample-delayed video signal from said second horizontal comparison means and the one line-delayed video signal from said one line memory to output a second diagonal sum signal and summing up the one sample-delayed video signal from said first horizontal comparison means and the one line-delayed and then one sample-delayed video signal from said third horizontal comparison means to output a vertical sum signal;
      first control signal generating means for adding the horizontal difference signals from said first to fourth horizontal comparison means, detecting a vertical difference signal between the one sample-delayed video signal from said first horizontal comparison means and the one line-delayed and then one sample-delayed video signal from said third horizontal comparison means and exclusive-ORing the sign bit of the added signal and that of the vertical difference signal to generate a control signal;
      second control signal generating means for generating a control signal in response to control signals from said first to fourth horizontal comparison means; and
      weight generating means for generating a weight signal in response to the control signal from said second control signal generating means;
      diagonal interpolation signal generating means for selecting one of first and second diagonal sum signals from said diagonal/vertical sum signal output means in response to the control signal from said first control signal generating means, the selected signal having a smaller diagonal difference, and amplifying the selected signal by a gain based on the weight signal from said weight generating means;
      interpolation signal output means for amplifying the vertical sum signal from said diagonal/vertical sum signal output means by the gain based on the weight signal from said weight generating means, summing up the amplified vertical sum signal and a diagonal interpolation signal from said diagonal interpolation signal generating means, averaging the summed signal and outputting the averaged signal as the interpolation signal;
   first time compressing means for compressing the time of the interpolation signal form said scanning line interpolating means; and
   second time compressing means for compressing the time of the video signal; and
   switching means for selectively and in turn outputting output signals from said first and second time compressing means.

5. An apparatus for interpolating scanning lines o? a TV signal in a TV, as set forth in claim 4, wherein said first to fourth horizontal comparison means each includes:
   a one sample memory for delaying a signal inputted therein by one sample;
   a subtracter for subtracting an output signal from said one sample memory from the signal inputted in said one sample memory;
   an absolute generator for taking an absolute of an output signal from said subtracter; and
   a comparator for comparing an output signal from said absolute generator with a predetermined reference value.

6. An apparatus for interpolating scanning lines of a TV signal in a TV, as set forth in claim 4, wherein said second control signal generating means includes:
   a bit adder for adding the control signals from said first to fourth horizontal comparison means;
   inverters for inverting high order 2 bits of an output signal from said bit adder, respectively; and an AND gate for ANDing output signals from said inverter gates and a least significant bit of the output signal from said bit adder and outputting the ANDed signal as the control signal.

7. An apparatus for interpolating scanning lines of a TV signal in a TV, as set forth in claim 4, wherein said weight generating means includes:
- a subtracter for obtaining a difference between an input signal and an output signal from said weight generating means delayed by one sample;
- a K amplifier for amplifying an output signal from said subtracter by a predetermined weight;
- an adder for adding an output signal from said K amplifier to the output signal from said weight generating means delayed by one sample and outputting the added signal as the weight signal; and
- a one sample memory for delaying an output signal from said adder by one sample and feeding back the one sampledelayed signal to said subtracter and said adder.

8. An apparatus for interpolating scanning lines of a TV signal in a TV, as set forth in claim 4, wherein said interpolation signal output means includes:
- a variable amplifier for amplifying the vertical sum signal from maid diagonal/vertical sum signal output means by the gain based on the weight signal from Bald weight generating means;
- an adder for adding an output signal from said variable amplifier to the diagonal interpolation signal from said diagonal interpolation signal generating means; and
- a ½ amplifier for averaging an output signal from said adder and outputting the averaged signal as the interpolation signal.

* * * * *